(12) United States Patent  (10) Patent No.: US 7,870,210 B2
Bhogal et al.  (45) Date of Patent: Jan. 11, 2011

(54) APPARATUS AND SYSTEM FOR IDENTIFYING AND FILTERING EMAILS BASED ON CONTENT

(75) Inventors: Kulvir S. Bhogal, Pflugerville, TX (US); Robert R. Peterson, Austin, TX (US); Lisa A. Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 12/171,731

(22) Filed: Jul. 11, 2008

(65) Prior Publication Data

US 2010/0011053 A1    Jan. 14, 2010

(51) Int. Cl.
*G06F 15/16* (2006.01)
(52) U.S. Cl. ............... 709/206; 709/204; 709/205; 709/207
(58) Field of Classification Search ............ 709/204, 709/205, 206
See application file for complete search history.

(56) References Cited

U.S. PATENT DOCUMENTS 6,018,761 A * 1/2000 Uomini ............... 709/206
2002/0091776 A1  7/2002 Nolan et al.
2004/0133561 A1  7/2004 Burke
2004/0249893 A1 * 12/2004 Leeds ............... 709/206
2006/0085504 A1  4/2006 Yang et al.
2006/0224675 A1  10/2006 Fox et al.
2006/0288298 A1  12/2006 Haitani et al.

OTHER PUBLICATIONS

Gmail Filters, Google Opertaing System, http://googlesystem.blogspot.com/2007/05/gmail-filters.html, May 28, 2007.
Tracking E-mail-Part 1, Mail Headers, MIME, HTML, and ASCII Text, http://www.expita.com/header1.html, Jan. 21, 2008.

* cited by examiner

*Primary Examiner*—Quang N. Nguyen
*Assistant Examiner*—Nghi V Tran
(74) *Attorney, Agent, or Firm*—Kunzler Needham Massey & Thorpe

(57) ABSTRACT

An apparatus and system are disclosed for regulating emails in an enterprise email system by marking, demarcating and referencing a content-context field in the header of the email. The content-context field designates the email as business or non-business in nature. Non-business emails are rejected, relayed elsewhere, or destroyed in response to positively identifying the email as non-business. The claimed invention prevents intermingling of non-business emails with business emails in business environments, and helps avoid potential liabilities that may result from associating business matters with personnel non-business matters.

6 Claims, 4 Drawing Sheets

APPARATUS AND SYSTEM FOR IDENTIFYING AND FILTERING EMAILS BASED ON CONTENT

FIELD OF THE INVENTION

This invention relates to regulating emails within enterprise email systems, and more specifically relates to identifying and filtering non-business emails sent to business email accounts by marking, demarcating, and referencing a content-context field in the email header.

DESCRIPTION OF THE RELATED ART

Emails that are personal and business in nature are often interspersed in business environments. Company employees frequently receive personal emails from family, friends, or other third-party organizations with whom they have various types of non-business or extra-business relationships. Many companies have policies prohibiting the use of company email accounts for non-business uses, but such policies are often difficult to enforce and often do not prevent a non-business email sent from outside the company from reaching employees' email inboxes.

The interspersion of non-business emails with business emails can result in unwanted liability for companies from a litany of legal doctrines. In some cases, company employees may expose their employers to claims of apparent authority liability by using the employee business email account for non-business purposes in a way that knowingly or unknowingly creates an impression that the company, and not the employee, is interacting with the email recipient to some degree, or approving implicitly of the interaction. In other instances, company employees may violate copyright laws by sending or receiving attachments in an unlawful manner, which behavior may result in charges of company liability under various civil and criminal statutes. Companies that are aware of non-business conduct or communications on the part of company employees may be forced to assume an unwanted duty to investigate or monitor the communications of employees using company email accounts to avoid claims that the company implicitly authorized the behavior.

SUMMARY OF THE INVENTION

From the foregoing discussion, it should be apparent that a need exists for an apparatus, system and method to regulate emails within enterprise email systems, and more specifically to automatically identify and reject non-business emails sent to business email accounts before those emails reach the business email accounts. Beneficially, the present invention solves such a problem by marking, demarcating, and/or referencing a content-context field in the email header.

In one embodiment of the present invention, a computer program product is executable to perform operations to regulate non-business emails at an email server such that non-business emails are not delivered to business email accounts.

The operations of the computer program product comprise receiving an email from a sender to a recipient; examining an email header of the email; reading a content-context field in the email header, the content-context field comprising a standard header field used by a sender of the email and messaging servers participating in transporting the email according to a standard email protocol.

The operations of the computer program product further regulating delivery of the email to a business email account identified in the recipient field of the email header in response to the content-context field designating the email as a non-business email, the operation to prevent delivery of the email comprising one of applying a corporate non-business email policy to the non-business email, destroying the non-business email, rejecting the non-business email, relaying the non-business email to a recipient-defined email address; and an operation to deliver the email to a business email account identified in the recipient field of the email header in response to the content-context field designating the email as a business email.

In one embodiment of the present invention, the computer program product also comprises an operation to notify a user through a graphical user interface (GUI) of regulated handing of a non-business email. In some additional embodiments, the content-context field is a boolean field. The operations of the computer program product may also comprise an operation to set the content-context field in response to content of the email satisfying a non-business email criteria.

Another embodiment includes a system to regulate non-business emails at an email server such that non-business emails are not delivered to business email accounts. This system comprises a processor; a data storage means for storing data; an email from a sender to a recipient comprising a header and body; and a mail agent configured to store, transfer and deliver email messages. The mail agent comprises modules configured to perform each of the operations of the computer program product claim above. In one embodiment, the mail agent also includes a receive module which is configured to receive an email header exclusive/separate from receipt of the body of the email.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not, therefore, to be considered to be limiting of its scope, the invention will be described and explained with additional specificity and detail through the use of the accompanying drawing, in which.

DETAILED DESCRIPTION OF THE INVENTION

Many of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials and so forth. In other instances, well-known structures, materials, or operations are not shown or described in detail to avoid obscuring aspects of the invention.

Figure 1:
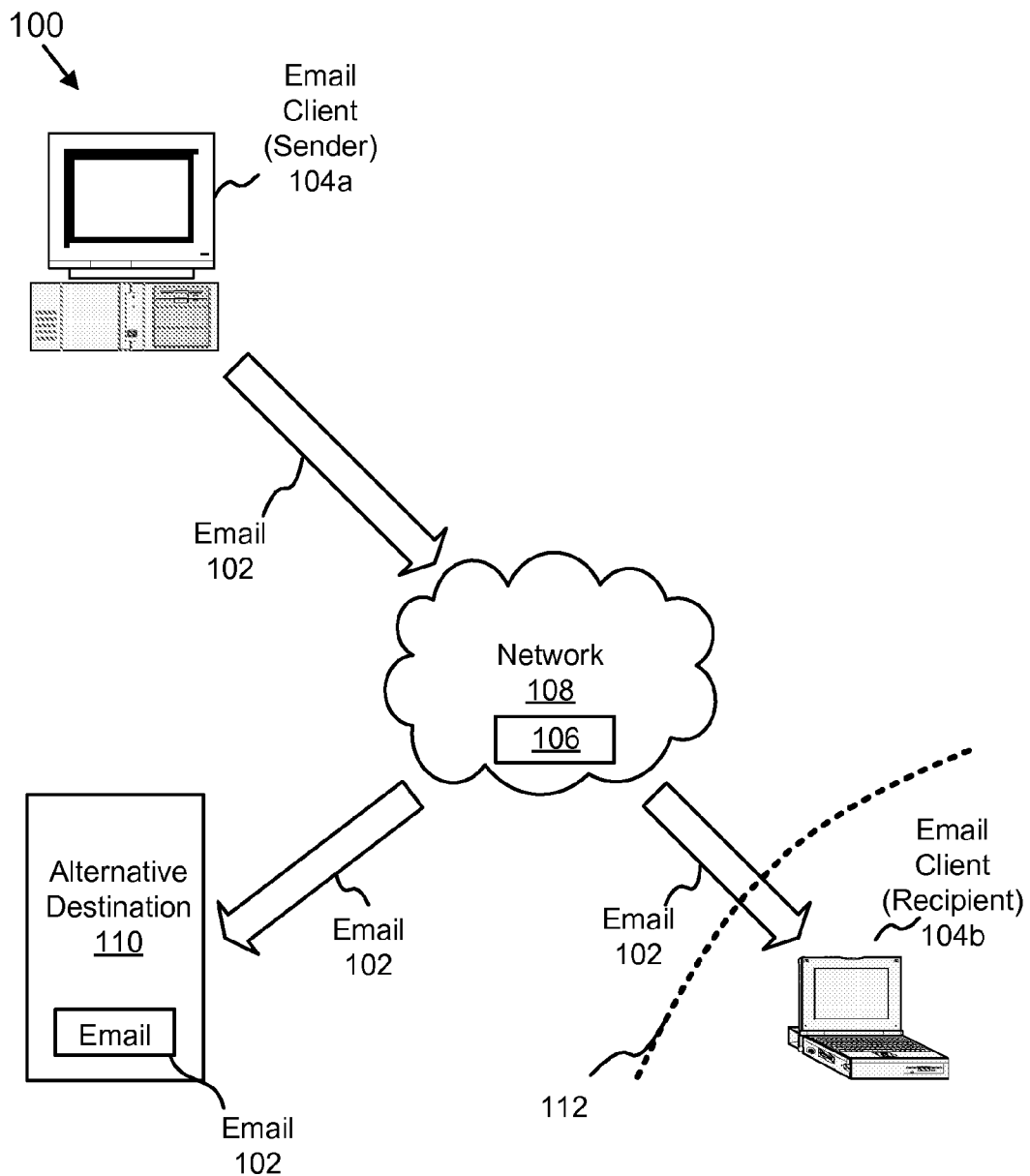
FIG. 1 is a block diagram illustrating one embodiment of a computer system that regulates non-business emails in accordance with the present invention.

FIG. 1 is a schematic block diagram illustrating one embodiment of a computer system that regulates non-business emails in accordance with the present invention. The computer system 100 includes an email message 102, an email client 104a, an email client 104b, a non-business email manager 106, a network 108, an alternative destination 110, and a virtual wall 112.

The email message 102 is an electronic mail message comprising a header and a body which is sent from a sender to recipient over the network 108. In the shown embodiment, the sender is email client 104a and the recipient is email client 104b. The email 102 may be formatted in accordance with Multipurpose Internet Mail Extension (MIME), or other standards set forth by the Internet Engineering Task Force (ITEF), or other formats as will be recognized by one of skill in the art.

Figure 2A:
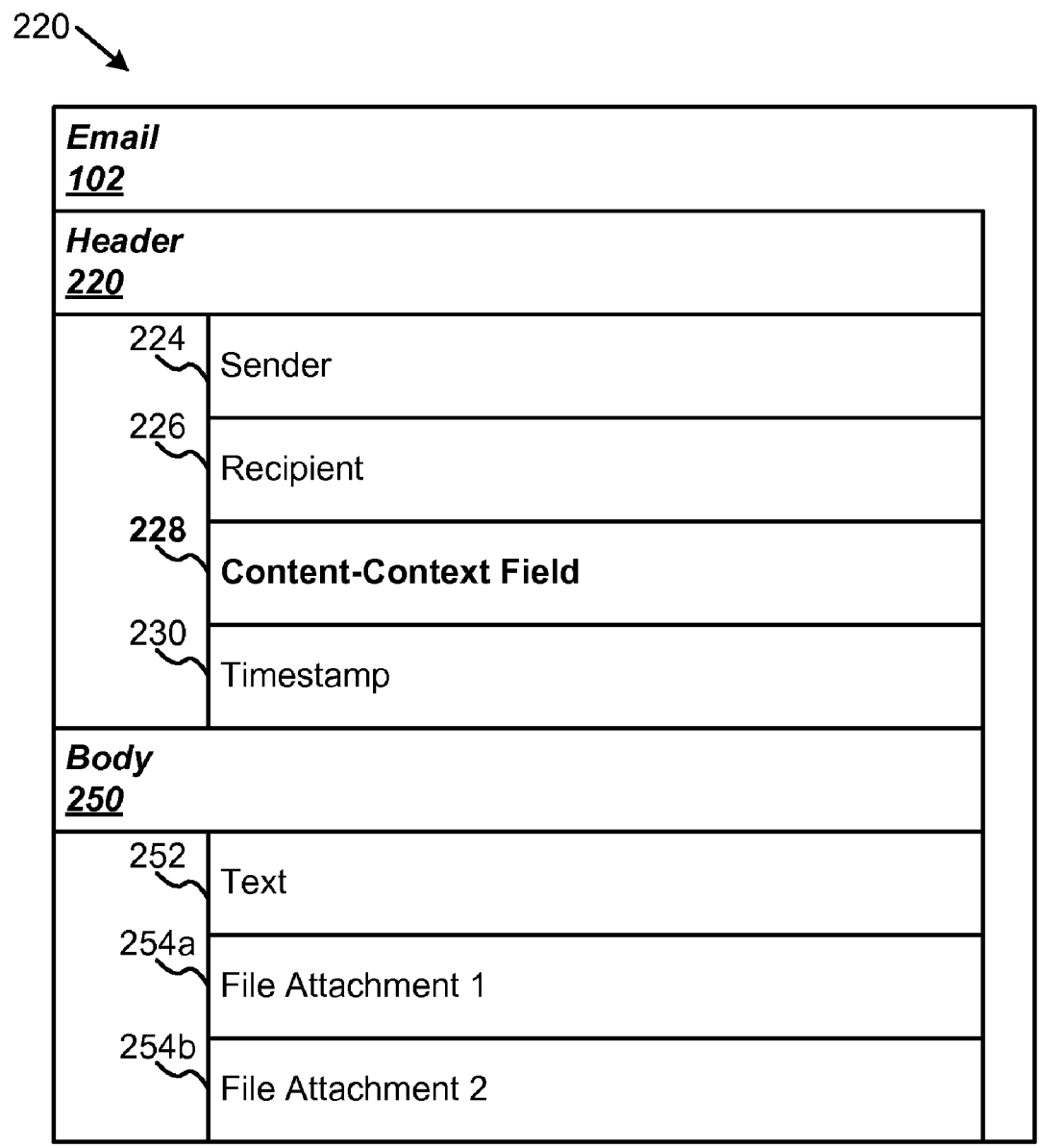
FIG. 2A is a diagram illustrating one embodiment of an email structured within a computer readable file.

In accordance with the present invention, the header of the email message 102 comprises an additional standard header field called a content-context field that accompanies other standard fields in the header of the email message 102, including: To, From, Subject, Date, Cc, Bcc, and others standard fields as maintained by the Internet Assigned Numbers Authority (IANA). A transfer protocol used to communicate the email message 102 is likewise modified to recognize the new content-context field in the standard header, as discussed below. In some embodiments, the context-context field may be a boolean field. In still other embodiments, an "X-header" field in the header of the email message 102 supports the content-context field. The email 102 may be encrypted or non-encrypted. The content-context field designates the email message 102 as business or non-business. FIG. 2A clarifies the structure of the email message 102.

In this embodiment, the email client sender 104a and the email client recipient 104b (collectively "email clients 104a-b") each comprise a computer program running on one or more data processing devices (DPDs), such as a server, computer workstation, router, mainframe computer or the like. The DPD comprises one or more processors. The processor is a computing device well-known to those in the art and may include an application-specific integrated circuit ("ASIC").

In the shown embodiment, email clients 104a-b comprise a front end computer program running on a DPD in close proximity to a human being or user. The email client 104a-b may comprise mail user agents (MUAs). In other embodiments, email clients 104a-b may comprise webmail applications running on one or more remote DPDs.

Email clients 104a-b, in this embodiment, are configured to interact with a user through a graphical user interface (GUI) coupled to the DPD. Email clients 104a-b are configured to retrieve email messages sent from, or through, mail servers in communication with a network 108. Email clients 104a-b are further configured to introduce and send new emails to either a mail transfer agent (MTA) or a mail submission agent (MSA), which are software programs that transfer emails from one DPD, mail server, or storage medium to another. In some embodiments, email clients 104a-b communicate with MSAs and/or MTAs using variations of the Simple Mail Transfer Protocol (SMTP) modified to recognize the content-context field in the standard headers of the email message 102. In some embodiments, the email clients 104a-b communicate with the mail server using the Internet Message Access Protocol (IMAP), likewise modified to recognize the content-context field. The email clients 104a-b may communicate with the mail server using the Post Office Protocol (POP), which allows the email clients 104a-b to retrieve, or download, emails one at a time and to delete emails from the mail server after they have been successfully saved to a storage coupled to or comprising the DPD. In those embodiments of the present invention in which the content-context field comprises a standard header in the header of the email message 102, the transfer protocol used by email clients 102a-b to transfer the email message 102 is also modified to recognize the content-context field in the standard header of the email message 102.

In the current embodiment, emails are stored locally on the DPDs running email clients 104a-b after being retrieved from the network 108. The email clients 104a-b request emails on behalf of a user from the network 108, or from the mail servers or MTAs in communication with the network. Normally, email clients 104a-b retrieve emails from a conventionally formatted storage connected to the network 108, such as mbox or other file formats used for storing assortments of emails. In this embodiment, email client 104a sends the email message 102 to a storage location on a mail server connected to, or within, the network 108. The email message 102 is retrieved by email client 104b and stored locally.

The email clients 104a-b mark or demarcate the content-context field in the header of the email message 102. In some embodiments, a sender, who is interfacing with the email client 104a, sets the content-context field directly by marking or demarcating the content-context field through a GUI or by other means well-known to those of skill in the art. In other embodiments, the email clients 104a-b may be configured to automatically reference the header and/or body of the email message 102 and automatically mark or demarcate the content-context field by applying a corporate non-business email policy to the email message 102, such as a list of email address of family, friends, and the like, which are indicative of non-business content. In other embodiments, the email clients 104a-b may automatically apply keyword(s) or fuzzy-logic filters to the header and/or body of the email message 102, which filters help determine whether the email message 102 is business or non-business and mark or demarcate the content-context field accordingly.

Only two email clients 104a-b are shown in FIG. 1 for the sake of convenience, but in other embodiments, a plurality of email clients may be connected to the network 108.

The non-business email manager 106, in this embodiment, comprises software embodied in stored computer readable instructions executable on a DPD connected to, or within, the network 108. The mail server may comprise the email clients 104a-b, or vice-versa. The mail server may comprise any one of a plurality of commercially available software packages and MTAs, including SendMail, Postfix™, Microsoft Exchange Server, Exim™, Imail™, Mdaemon™, MailEnable, Gmail™ or the like.

In accordance with the present invention, the non-business email manager 106 is configured to regulate delivery of the email message 102 based on a designation determined by reading the content-context field. In this embodiment, if the content-context field designates the email message 102 as non-business, the non-business email manager 106 relays the non-business email message 102 to the alternative destination 110 that has been predefined by email client 104b (the recipient). In other embodiments, the non-business email manager 106 destroys the non-business email message 102. In still other embodiments, the non-business email manager rejects the non-business email message 102.

The network 108 is a computer network. The network 18 may be a localized network structure or intranet. In other embodiments, the network 18 may utilize a wide-area network structure or the Internet to communicate with email clients 104a-b, MUAs, mail servers, storage, and the like.

The alternative destination 110 may be any remote mail server, MUA, storage, or other device or system in communication with the network 108 or the recipient email client 104b. Access to the alternative destination 110, however, is not provided to email recipients by the company(ies) associated with the business emails within the business environment (e.g. those company(ies) shielded by the virtual wall 112).

The virtual wall 112 is illustrative of the shielding effect that the present invention has on the recipient email client 104b. The operations of the present invention shield email clients and users within the business environment from receiving non-business emails and consequently also shield the business from potential liability associated with the non-business emails. The virtual wall 112 is a virtual protective barrier in accordance with the present invention.

FIG. 2A is a diagram illustrating one embodiment of an email message 102 structured within a computer readable file. The email message 102 comprises a header 220 and a body 250.

The header 220 comprises standard header fields. The header 220 comprises a sender field 224, a recipient field 226, a content-context field 228, a timestamp 230, and other standard header fields as described above. The content-context field designates the email message 102 as business or non-business in accordance with the present invention.

The body 250 of the email 102 comprises a text field 252, and file attachments 254a-b. The text field 252 comprises the email content formatted in plain text, HTML (HyperText Markup Language), 7-bit ASCII (American Standard Code for Information Interchange), 8-bit clean, Unicode, or other formats as well-known to those of skill in the art.

The file attachments 254a-b comprise computer files sent with the email 102 to supplement or accompany the text field 252. Computer files are blocks of information well-known to those of skill in the art.

Figure 2B:
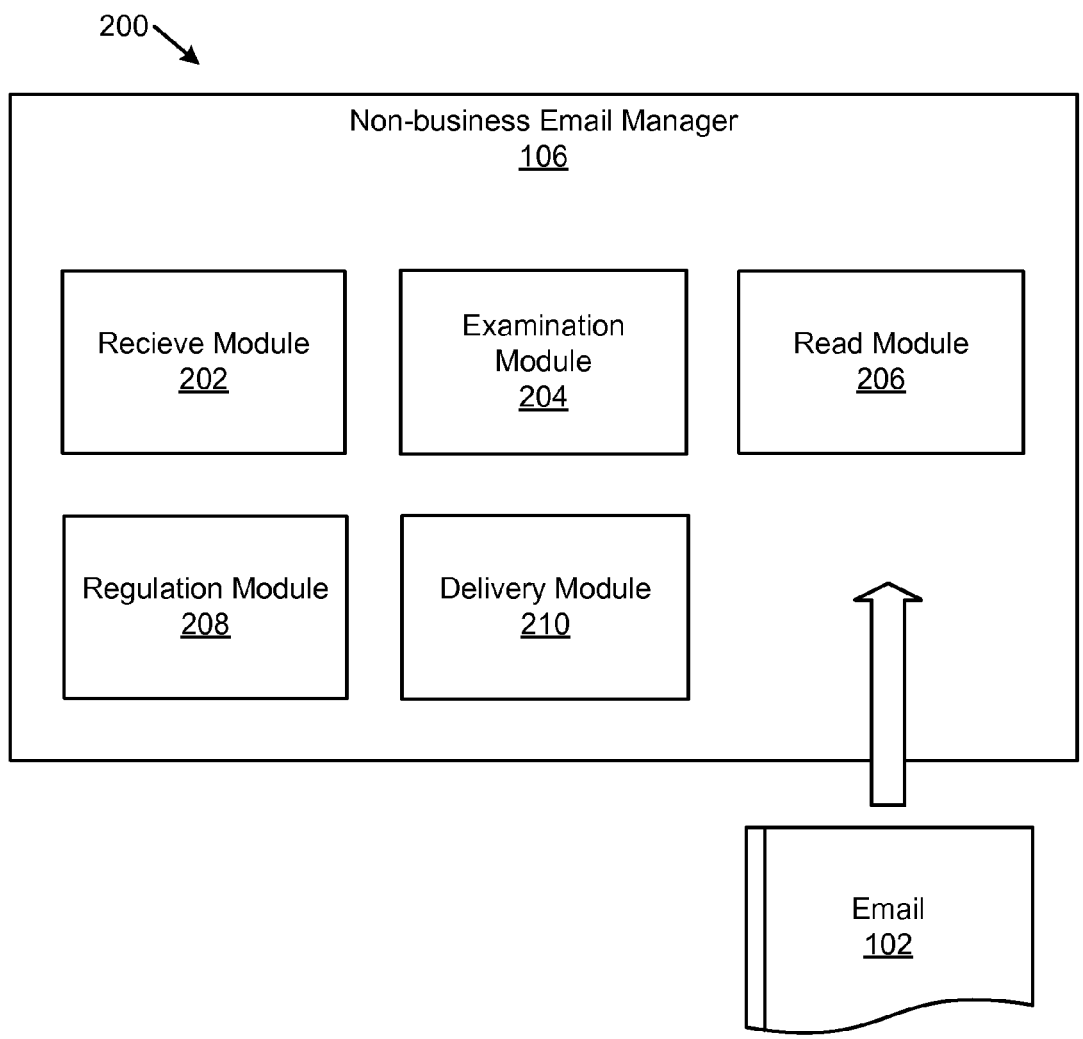
FIG. 2B is a schematic block diagram illustrating one embodiment of a non-business email manager in accordance with the present invention.

FIG. 2B is a schematic block diagram illustrating one embodiment of a non-business email manager 106 in accordance with the present invention. The non-business email manager 106 includes a receive module 202, an examination module 204, a read module 206, a regulation module 208, a delivery module 210, and an email message 102.

The receive module 202 is configured to receive the email message 102 from another email client 104a-b, MUA, MTA, mail server or the like.

The examination module 204 is configured to examine the header of the email message 102 that has been received by the receive module 202.

The read module 206 is configured to read the content-context field in the header of the email message 102 and determine whether the context-context field has been designated business or non-business.

The regulation module 208 is configured to regulate delivery of the email message 102 to a business email account identified in the recipient field (or 'to' field) of the email message 102 header. The regulation module 208 operates to prevent delivery of the email 102 if the email 102 is designated non-business in the content-context field. The regulation module 208 may be configured, in various embodiments, to prevent delivery of the email message 102 by destroying the non-business email message 102, rejecting the non-business email message 102, or relaying the non-business email to an alternative destination 110. In some embodiments, the alternative destination 110 is a recipient defined alternative email address. In some embodiments, the regulation module 208 may prevent or allow delivery of the email message 102 by applying a corporate non-business email policy to the email message 102. The corporate non-business email policy may override other operations and allow, for example, senior managers or low-risk employees to receive non-business emails in spite of the designation in the content-context field.

The delivery module 210 is configured to deliver the email message 102 to the business email account identified in the recipient field of the email header in response to the content-context field designating the email as a business email. In some embodiments, the delivery module 210 is additionally or alternatively configured to deliver the email message 102 to the business email account identified in the recipient field of the email header in response to the corporate non-business email policy allowing the business email account identified to receive non-business emails. In some embodiments, the delivery module 210 furthers delivery of the email message 102 to an MTA, mail server, or like system or device.

Figure 3:
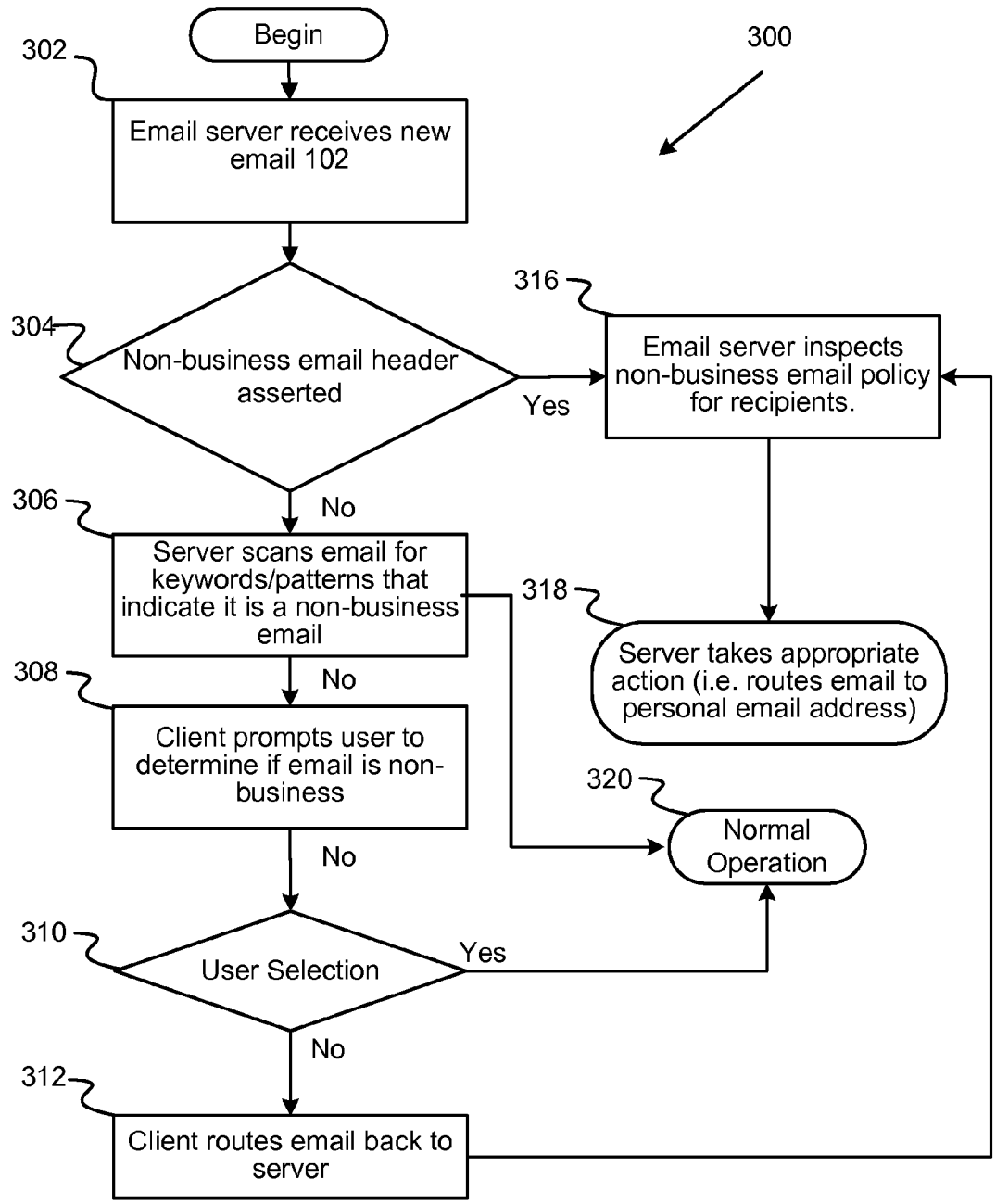
FIG. 3 is a flow chart of a method of regulating non-business emails in accordance with one embodiment of the present invention.

FIG. 3 is a flow chart of a method 300 of regulating non-business emails in accordance with one embodiment of the present invention. The method 300 substantially includes the embodiments and modules described above with regard to the apparatus and system depicted in FIGS. 1-2B. The method 300 begins and the email server receives 302 an email message 102. In this embodiment, the email server comprises a non-business email manager 106 in accordance with the present invention.

The examination module 204 examines the header 220 of the email message 102 and the read module 206 reads 304 the content-context field 228 in the header 220.

In this embodiment, if the content-context 228 designates the email message 102 as non-business, the regulation module 208 references 316 a corporate non-business email policy for handling a non-business email message 102. If the intended recipient of the email message 102 (as specified in the 'to' field) has been granted rights to receive non-business emails by the corporate non-business email policy, the email server allows 318 delivery of the email message 102 to the appropriate business email account. Other embodiments of the present invention may include different non-business email criteria or corporate non-business email policies, and some embodiments of the present invention may not reference any company-generated policies.

In the shown embodiment, if the read module 206 determines 304 that the content-context field 228 of the email message 102 is undefined or designates the email message 102 as a business email, then the regulation module 208 scans 306 the email message 102 using keyword(s) or fuzzy-logic filters to determine whether the email message 102 is actually a business email.

If the email message 102 is determined to most likely be a business email, the delivery module 210 delivers the email message 102 to a business email account of the recipient and normal operations resume 320.

If the status of the email message 102 is still undetermined, a user interface may prompt 308 a user to designate the email as business or non-business based on select information in the header and/or body. For instance the user interface may prompt 308 the user to designate the email as business or non-business based on a subject line, or the first twenty-five characters of text in the email body. If the user designates 310 the email message 102 as a business email, the delivery module 210 delivers the email message 102 to a business email account for the recipient and normal operations resume 320. If the user designates 310 the email message 102 as a non-business email, the regulation module 208 routes 312 the email message 102 back to the server which applies 316 the corporate non-business email policy to the non-business email message 102.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a non-transitory storage device storing executable code executed by a processor to perform operations to regulate non-business emails at an email server such that non-business emails are not delivered to business email accounts, the operations of the computer program product comprising:
   an operation to receive an email from a sender to a recipient;
   an operation to examine an email header of the email;
   an operation to read a content-context field in the email header, the content-context field comprising a standard header field defined by an Internet Assigned Numbers Authority and demarcated by the sender of the email according to a revised standard email protocol;
   an operation to regulate delivery of the email to a business email account of the recipient as identified in a recipient field of the email header in response to the content-context field designating the email as a non-business email and the recipient not being granted rights to receive non-business emails by relaying the non-business email to a recipient-defined email address; and
   an operation to deliver the email to the business email account of the recipient as identified in the recipient field of the email header in response to the content-context field designating the email as a business email else to deliver the email to the business email account of the recipient in response to the recipient being granted rights to receive non-business emails.

2. The computer program product of claim 1, further comprising an operation to notify a user through a graphical user interface (GUI) of regulated handing of a non-business email.

3. The computer-program product of claim 1, wherein the content-context field is a boolean field.

4. The computer program product of claim 1, further comprising an operation to demarcate the content-context field as non-business in response to content of the email satisfying a non-business email criteria.

5. A system to regulate non-business emails at an email server such that non-business emails are not delivered to business email accounts, the system comprising:
   a processor;
   a data storage device for storing data;
   an email from a sender to a recipient comprising a header and body;
   a mail agent configured to store, transfer and deliver email messages, the mail agent comprising:
   a receive module configured to receive the email;
   an examination module configured to examine the email header;
   a read module configured to read a content-context field in the email header, the content-context field comprising a standard header field defined by an Internet Assigned Numbers Authority and demarcated by the sender of the email according to a revised standard email protocol;
   a regulation module configured to regulate delivery of the email to a business email account of the recipient as identified in a recipient field of the email header in response to the content-context field designating the email as a non-business email and the recipient not being granted rights to receive non-business emails by relaying the non-business email to a recipient defined email address; and a delivery module configured to deliver the email to the business email account of the recipient as identified in the recipient field of the email header in response to the content-context field designating the email as a business email else to deliver the email to the business email account of the recipient in response to the recipient being granted rights to receive non-business emails.

6. The system of claim 5, wherein the receive module is further configured to receive the email header exclusive of the body of the email.

* * * * *